US012124222B2

(12) United States Patent
Gueissaz et al.

(10) Patent No.: US 12,124,222 B2
(45) Date of Patent: Oct. 22, 2024

(54) ANNULAR FLUIDIC SYSTEM WITH COMPASS FUNCTION

(71) Applicant: The Swatch Group Research and Development Ltd, Marin (CH)

(72) Inventors: François Gueissaz, Cormondrèche (CH); Michel Willemin, Prêles (CH); Matthias Imboden, St-Blaise (CH)

(73) Assignee: The Swatch Group Research and Development Ltd, Marin (CH)

( * ) Notice: Subject to any disclaimer, the term of this patent is extended or adjusted under 35 U.S.C. 154(b) by 496 days.

(21) Appl. No.: 17/466,321

(22) Filed: Sep. 3, 2021

(65) Prior Publication Data

US 2022/0269219 A1     Aug. 25, 2022

(30) Foreign Application Priority Data

Feb. 22, 2021 (EP) ...................... 21158373

(51) Int. Cl.
| | |
|---|---|
| *G04B 47/06* | (2006.01) |
| *G01C 17/02* | (2006.01) |
| *G01C 17/08* | (2006.01) |
| *G01K 5/04* | (2006.01) |
| *G01L 7/18* | (2006.01) |

(52) U.S. Cl.
CPC ........... *G04B 47/065* (2013.01); *G01C 17/02* (2013.01); *G01C 17/08* (2013.01); *G04B 47/06* (2013.01); *G01K 5/04* (2013.01); *G01L 7/182* (2013.01)

(58) Field of Classification Search
CPC ...... G04B 46/065; G04B 47/06; G01C 17/08; G01C 17/02; G01K 5/04; G01L 7/182
See application file for complete search history.

(56) References Cited

U.S. PATENT DOCUMENTS 4,680,544 A * 7/1987 Rudolf ................ G01R 33/028
                                                  324/259
6,430,825 B1    8/2002 Baumann

FOREIGN PATENT DOCUMENTS

| CN | 1127371 A | 7/1996 |
| CN | 110440776 A | 11/2019 |
| JP | 57-170011 U | 10/1982 |
| JP | 59-175191 U | 11/1984 |
| JP | 4-29011 A | 1/1992 |

OTHER PUBLICATIONS

Machine translation of Funakoshi, JP H0429011 A (original provided by Applicant) (Year: 2024).*
Machine translation of Yokoyama (JP S59175191) (Year: 2024).*

(Continued)

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

An annular fluidic device includes a closed annular tube, wherein the tube includes at least one portion of transparent wall and contains a rigid torus bathed in a fluid filling the internal volume of the tube, in that the torus is arranged to be movable in the tube, and wherein at least one permanently polarised magnetic element integral with the torus allows it to undergo a moment of force causing it to be aligned in the direction of the external magnetic vector. A watch case can include this device.

18 Claims, 5 Drawing Sheets

(56) References Cited

OTHER PUBLICATIONS

Britannica article "Alcohol", captured by the Internet Archive Jan. 5, 2021 (Year: 2021).*
RheoSense page with viscosity data for ethyl alcohol and distilled water, captured by the Internet Archive Aug. 13, 2020 (Year: 2020).*
Wikipedia article "Silicone oil", captured by the Internet Archive Dec. 2, 2020 (Year: 2020).*
Combined Chinese Office Action and Search Report issued on Jan. 28, 2023 in Chinese Patent Application No. 202111056044.2 (with translation of category of cited documents), 10 pages.
Japanese Office Action issued on Sep. 6, 2022 in Japanese Patent Application No. 2021-137758 (with English translation), 9 pages.
European Search Report issued Jan. 14, 2021 in European Application 21158373.7, filed on Feb. 22, 2021 (with English Translation of Categories of cited documents), 3 pages.

* cited by examiner

ANNULAR FLUIDIC SYSTEM WITH COMPASS FUNCTION

CROSS-REFERENCE TO RELATED APPLICATION

This application claims priority to Swiss Patent Application No. 01129/20, filed on Sep. 9, 2020 and European Patent Application No. 21158373.7, filed on Feb. 22, 2021, the entire disclosures of which are hereby incorporated herein by reference.

TECHNICAL FIELD OF THE INVENTION

The invention relates to a wearable object such as a wristwatch provided with additional functions typically a magnetic compass function, and optionally a barometer or thermometer function as well as a level indication function.

TECHNOLOGICAL BACKGROUND

Navigation compasses in the shape of a sphere in a globe filled with liquid are already known. Barometers using closed bellows changing volume according to the ambient pressure as well as thermometers using the thermal expansion of liquids are also known. Some of these devices were incorporated into wristwatches.

However, it is understood that these devices are very bulky in the watch case at the dial and therefore require significant modifications to the usual aesthetics of wristwatches, which can harm their attractiveness.

SUMMARY OF THE INVENTION

The purpose of the invention is to provide, in an object worn such as a wristwatch, the functions of a magnetic compass and optionally of a barometer or of a thermometer, in a magnetic-fluidic system without using an electronic system, and without the need for an auxiliary power supply, leaving an empty central space so as to receive a watch movement.

To this end, the invention relates to a device which provides an annular configuration, comparable to a watch bezel, which does not set constraints in its central portion, apart from the absence of ferromagnetic or magnetically polarised materials, to house, for example, a watch movement therein. The main function targeted by this invention is to constitute a magnetic compass.

The invention relates to the production of an annular structure floating in gravimetric equilibrium, with a coefficient of static friction almost zero, inside an annular tube filled with a suitable fluid, the assembly being called annular "ludion" fluidic system with compass function.

This movable annular structure includes at least one magnet or a magnetised portion, polarised so that it undergoes a moment of force when it is placed in the earth's magnetic field.

This moment of force acts on the structure and forces it to be aligned in the direction of the earth's magnetic vector. The alignment is carried out almost perfectly, thanks to the low static friction force, with a time constant which depends on the nature of the fluid wherein the movable structure is bathed, and on various factors such as the mass of the movable structure, the magnitude of the magnetic force, the space separating it from the wall of the annular tube containing it, etc.

The virtual absence of static friction forces is based, on the one hand, on the gravimetric balance obtained by adjusting the density of the movable structure so that it is equal to that of the fluid filling the annular tube, and, on the other hand, on the lubricating properties of this fluid.

The time constant of alignment of the movable structure on the earth's magnetic vector must be less than about 1 second in order to allow 95% of the angular displacement in less than about 3 seconds (assuming proportional viscous forces at angular speed) for convenient use.

Secondary functions, such as barometric or thermometric functions, can be considered in the context of the present invention. They use the compressibility properties of a closed volume of gas, according to the gas law, or the expansion of a fluid depending on the temperature.

The invention allows to achieve one or more useful functions, with an innovative aesthetic in a wearable object such as a wristwatch, these functions being able to be in particular integrated into the bezel of the watch and therefore without affecting the aesthetics of the dial.

BRIEF DESCRIPTION OF THE FIGURES

Other features and advantages of the present invention will appear in the following description of preferred embodiments, shown as a non-limiting example with reference to the appended drawings.

DETAILED DESCRIPTION OF THE INVENTION

The present invention relates to an annular fluidic device providing the function of a compass and optionally a thermometer or barometer, as well as the level indication function.

Figure 1A:
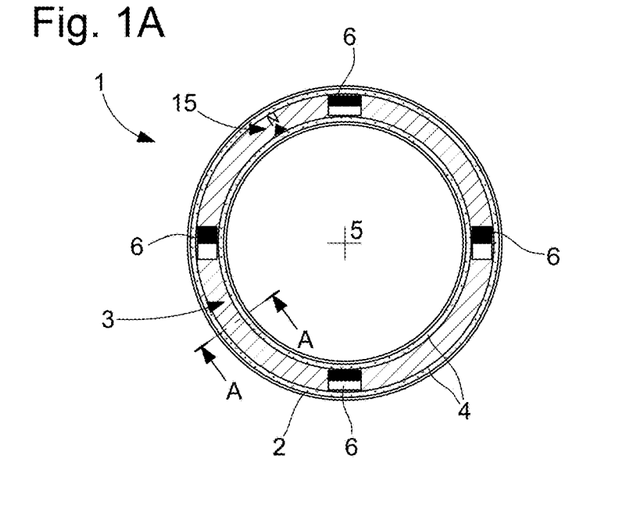
FIGS. 1A and 1B show a schematic plan and sectional representation of the annular fluidic device according to the invention with the annular structure provided with magnets floating in an annular tube to perform a compass function.
Figure 1B:
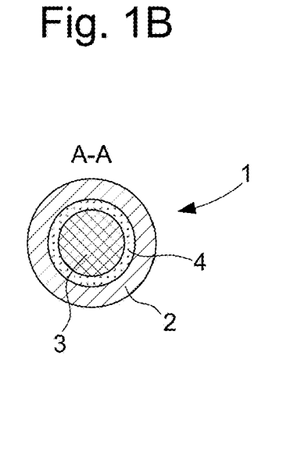

According to a first embodiment shown in FIGS. 1A and 1B, the device of the invention incorporates the only function of a magnetic compass.

The device 1 comprises an annular tube 2 closed at its ends, the wall of the tube being of circular, square, or other section. This tube 2 represents the outer casing of the device, which is integrated for example into a watch case. The wall of this tube is transparent at least on a portion which is intended to be visible from the outside after integration into the watch case or other object. The thickness of the wall can vary in its visible part, in order to produce an advantageous optical effect for the visualisation of the cardinal point(s) 15 indicated by the floating system 3 inside this tube as described below. The inner wall of the tube can also be covered with a thin functional layer such as a perfluoropolymer layer, for example PTFE (polytetrafluoroethylene), or the like such as parylene, etc. reducing friction forces.

A floating system 3, for example in the shape of a rigid torus, is placed inside this tube 2. It bathes in a suitable fluid 4 filling the empty space. The floating system 3 is mounted to rotate freely around the central axis 5 of the tube 2 and relative to said annular tube 2 which is integral with the object within which it is disposed.

Figure 4:
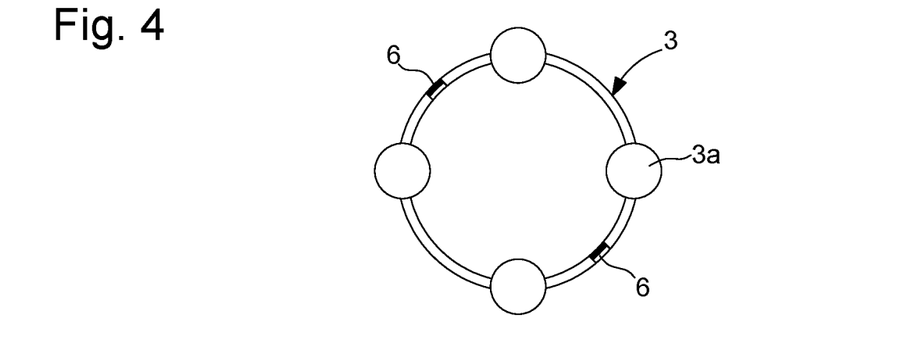
FIG. 4 shows a schematic plan representation of a variant of the annular structure of the device according to the invention.

This floating system can consist of a single annular solid volume or of several elements connected by a ring. The section of this solid volume or of the elements connected by a ring is less than the internal section of the annular tube containing them. Various section geometries can be considered, on the one hand in order to reduce the effects of friction with the inner wall of the annular tube, and on the other hand in order to meet the aesthetic criteria of the intended application. Other embodiments are possible where a thinner ring connects several guide elements within the annular tube. In the example of FIG. 4, the elements connected by a ring are spheres 3a.

The system 3 floating inside the annular tube 2 comprises one or more permanent magnetic elements 6 integral with the floating system 3. They are two in number in the example of FIG. 4, four in the example of FIGS. 1A and 1B, six in the example of FIG. 9, eight in FIG. 6A and twelve in FIG. 6C. In a variant shown in FIG. 6D, the floating system 3 can be formed of a fully magnetised ring (magnetic element 6) with, for example, the ring covered with a thin magnetic layer. The magnets can be aligned in the same direction as shown schematically in FIGS. 1A, 1B, and 6A or in different directions as shown schematically in FIGS. 5, 6B and 6C. The magnet(s) 6 allow the floating system 3 to undergo a moment of force causing it to be aligned in the direction of the external magnetic vector, that is to say of the terrestrial magnetic field, as shown schematically in FIG. 5. These magnets are, for example, overmoulded by the material of the floating system. They may, for example, be magnets made from an alloy of samarium and cobalt. Preferably, these magnets are distributed in an axisymmetric manner over the circumference of the floating system. For the configuration of FIG. 4 with a ring connecting elements such as spheres, the magnets can be disposed in the spheres, on the ring or be the ring as such. According to a variant not shown, polarisable particles can be integrated into the material of the floating system and then magnetised. Advantageously, the floating system is made of a plastic material, typically ABS (acrylonitrile butadiene styrene).

Figure 5:
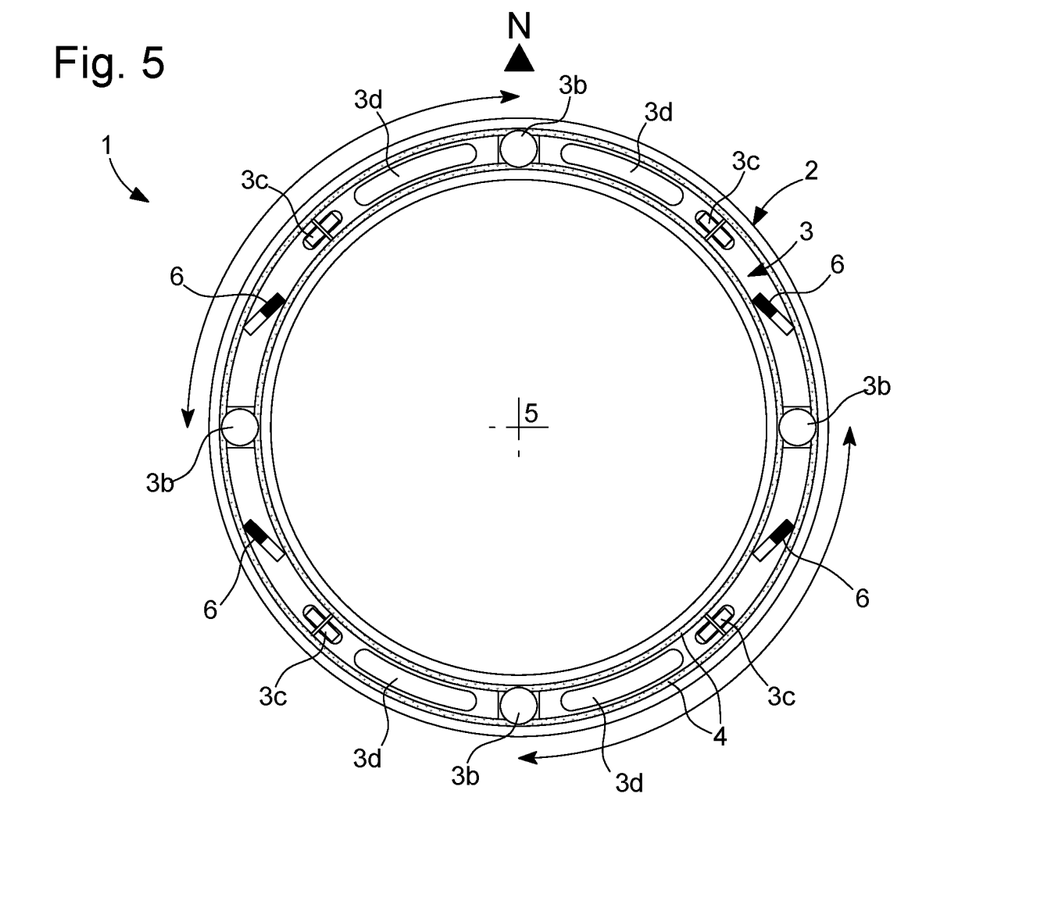
FIG. 5 schematically shows the device according to the invention with the annular structure provided with magnets subjected to a moment of force causing it to be aligned in the direction of the external magnetic vector by rotation.
Figure 6A:
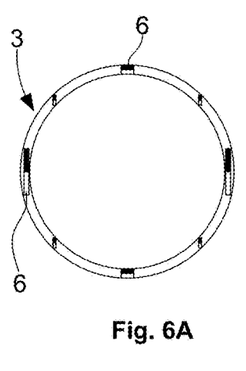
FIGS. 6A, 6B, 6C, and 6D show four different configurations for distributing the magnet(s) on the annular structure of the device according to the invention.
Figure 6B:
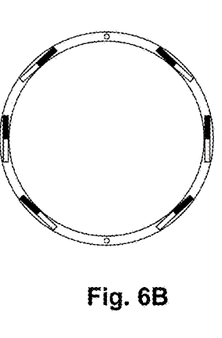
Figure 6C:
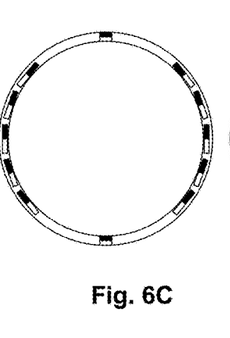
Figure 6D:
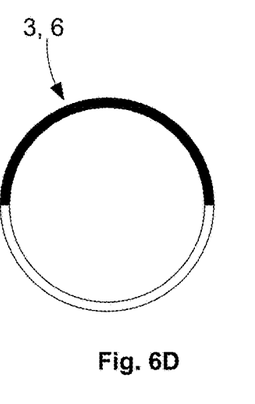

To adjust the density of the torus, or more generally of the floating system, and so that it floats in the fluid, the torus can further comprise one or more cavities filled with air 3d, in order to adjust the gravimetric balance in the fluid 4 surrounding it (FIG. 5).

Preferably, the outer surface of the floating system is covered with a thin functional layer such as a perfluoropolymer layer, for example PTFE, or the like such as parylene, etc. reducing friction forces.

As shown in FIG. 5, the floating system 3 can also be provided with wheels 3b, called horizontal wheels, which are free to rotate about an axis parallel to the central axis 5 and/or wheels 3c, called vertical wheels, which are free to rotate about an axis perpendicular to the central axis 5. These horizontal and vertical wheels are mounted with a clearance relative to the walls of the annular tube 2 and are intended to reduce the friction in the directions parallel and perpendicular to the central axis 5.

The floating system can be provided with a decoration corresponding to the aesthetic chosen for the intended application.

In a preferred embodiment, this decoration comprises phosphorescent or fluorescent portions. As mentioned above, the floating system is also marked with at least one cardinal point referenced 15 in the figures.

A suitable fluid will be chosen to fill the empty space between the inner wall of the annular tube and the floating system. The main features of the fluid are transparency, low viscosity and an adequate density which is substantially equal to that of the floating system. The dynamic viscosity is typically comprised between 0.3 and 10 mPa s.

This fluid can be composed of H—C—O hydrocarbon chains (organic solvent) or of a silicone oil, onto which other functional radicals can be grafted.

The static frictional forces must produce a static frictional moment much lower than the magnetic moment applied by the interaction of the floating system with the earth's magnetic field, in order to give an accurate indication of the magnetic north.

Finally, the dynamic frictional forces must be low enough to allow rapid positioning of the floating system, with a time constant less than or equal to typically 1 second.

Figure 2:
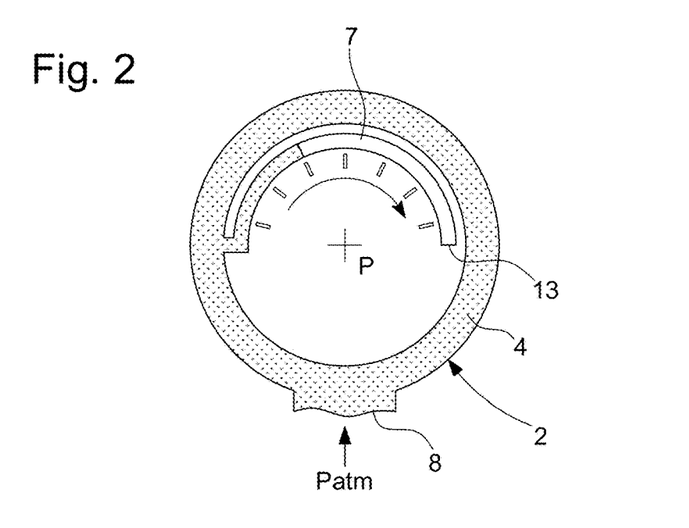
FIG. 2 shows the arrangement of this same device allowing to also indicate the atmospheric pressure, the annular structure not being shown.

According to a second embodiment shown in FIG. 2, the device of the invention incorporates the compass function as well as the barometer function.

A second capillary tube 7 is grafted onto the annular tube 2 described in connection with the first embodiment. This capillary tube of small internal section, with typically an internal diameter of 50 and 500 μm, is in fluid communication with the annular tube. Its external geometry is calculated in order to make visible a coloured line deposited on its rear face, on the portion filled with the transparent fluid coming from the annular tube described above, by an optical effect producing a strong contrast.

An expansion volume 13, filled with a gas or a compressible gas mixture, for example air, is placed at the free end of the capillary tube 7, and a membrane 8 is placed on the annular tube 2 in order to transmit the atmospheric pressure on the fluid 4. In this way, the fluid can move inside the capillary depending on the atmospheric pressure and give an indication thereof.

Figure 3:
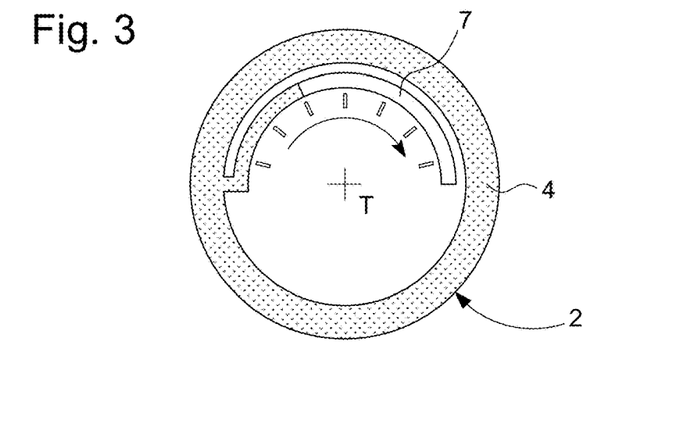
FIG. 3 shows the arrangement of the device of FIG. 1 for further indicating the temperature, the annular structure not being shown.

According to a third embodiment shown in FIG. 3, the device of the invention incorporates the compass function as well as the thermometer function.

The device incorporates the additions described in connection with the second embodiment, with the exception of the membrane which is removed, in order to allow the thermal expansion of the fluid to produce its displacement in the display capillary described in connection with the second embodiment, thus giving an indication of temperature instead of atmospheric pressure.

According to a fourth embodiment, the device of the invention further incorporates the level indication function, of the bubble level type, for improved use of the magnetic compass function. This level indication function can be present in addition to the thermometer or barometer function.

Figure 7:
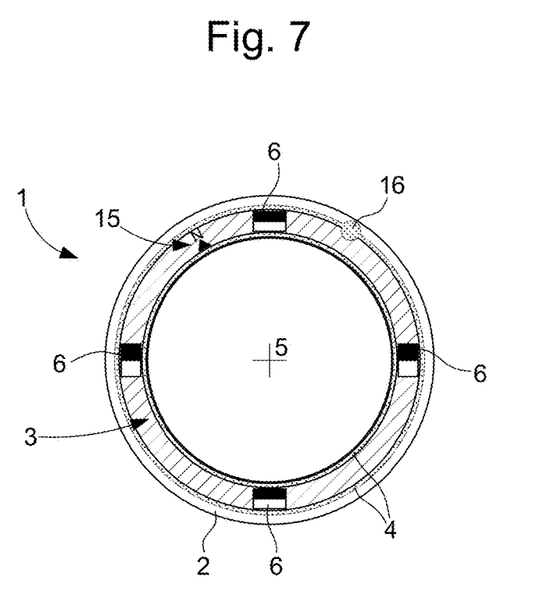
FIG. 7 shows a schematic plan representation of the annular structure and the annular tube with a clearance for a bubble level.

The floating system 3 inside the annular tube 2 described in connection with the first embodiment will comprise a clearance 16 in its part intended to be visible and communicating with the fluid, in order to allow the passage of one or more air bubbles, in order to give an indication of the level or, in other words, of the attitude of the device according to the invention worn by the user (FIG. 7). A clearance 16 may also advantageously be made in the upper part of the annular tube 2, so as to provide a passage of circular section in the fluid. Alternatively, only the annular tube 2 can be provided with the clearance 16.

Figure 8A:
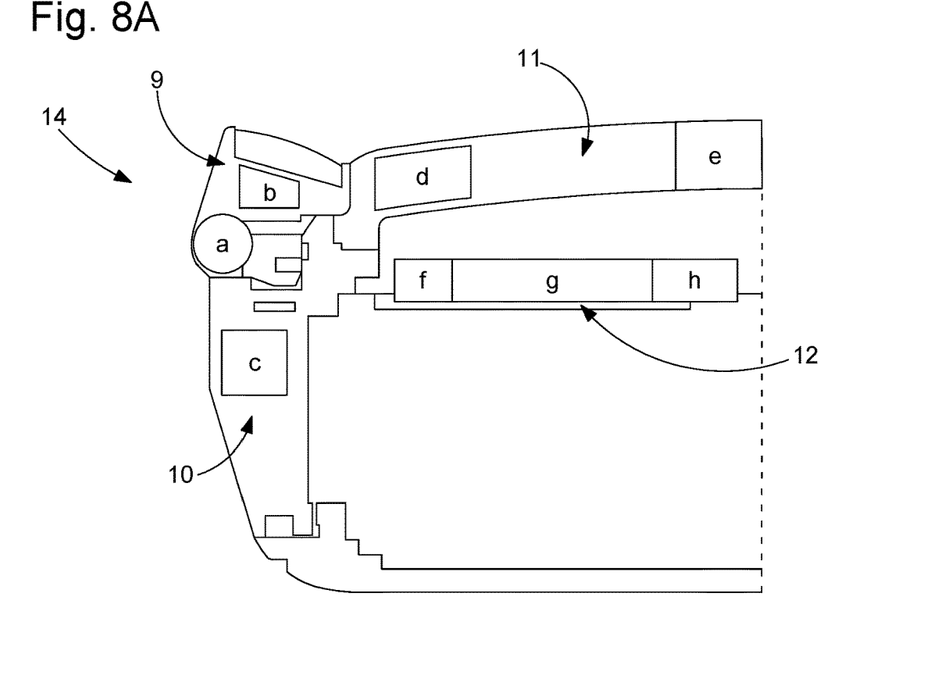
FIG. 8A schematically shows with a half sectional view the different possible positions of the annular fluidic device according to the invention within a watch case.
Figure 8B:
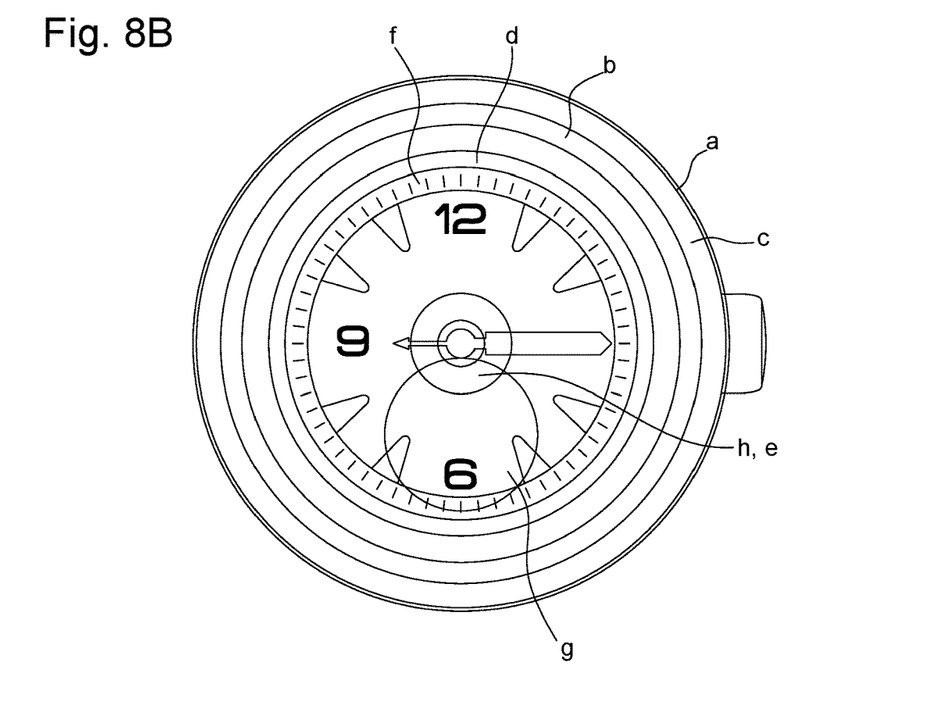
FIG. 8B shows these same positions in a plan view of the watch case.

For a horological application, the device according to the invention can be positioned in several places within the watch case. FIGS. 8A and 8B schematically illustrate the different positions that the device can occupy within the watch case. In a non-exhaustive manner, it can be positioned at the bezel 9 for the positions a and b, of the middle part 10 for the position c, of the crystal 11 for the positions d and e and of the dial 12 for the positions f, g and h.

Figure 9:
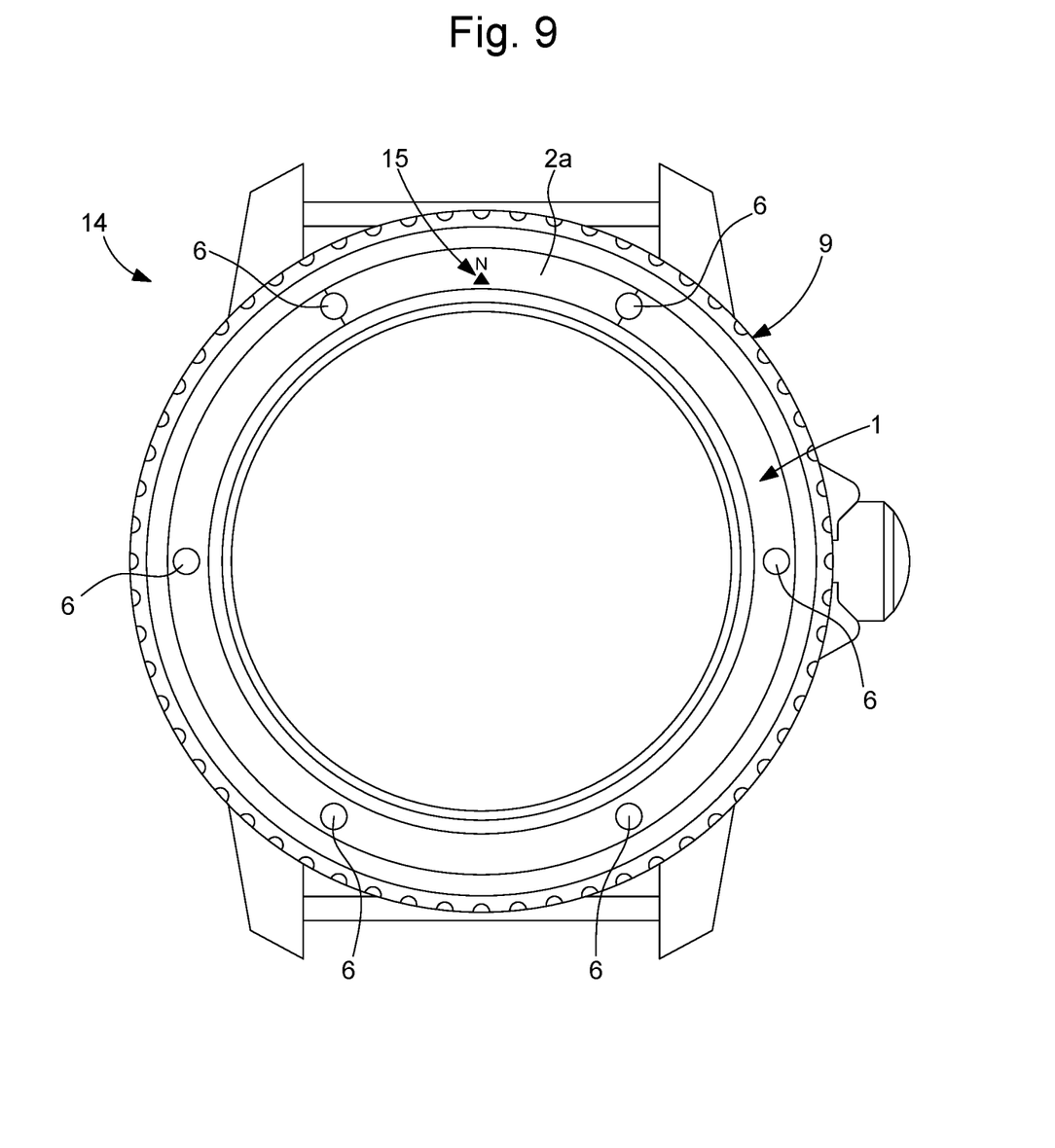
FIG. 9 shows a plan view of a watch case provided with the annular device according to the invention disposed in the bezel.

As previously mentioned, only part of the wall of the annular tube can be transparent and allow the floating system to be viewed from outside the watch case. Such an example is shown in FIG. 9 where the floating system disposed at the bezel 9 is only visible through the transparent portion 2a of the wall which is at 12 o'clock on the watch case 14. In this case, the marking of the floating system must be sufficient so that at least one cardinal point 15 is visible through the transparent wall regardless of the angular position of the floating system.

LEGEND (1) Annular fluidic device
(2) Annular tube, also called main tube,
  a. Transparent wall portion
(3) Floating system, floating structure or torus
  a. Sphere
  b. Horizontal wheel
  c. Vertical wheel
  d. Recess or cavity
(4) Fluid
(5) Central axis of the tube
(6) Magnetic element
(7) Capillary tube, also called secondary tube,
(8) Membrane
(9) Bezel
(10) Middle part
(11) Crystal
(12) Dial
(13) Expansion volume
(14) Watch case
(15) Cardinal point
(16) Clearance

The invention claimed is:

1. An annular fluidic device, comprising:
  an annular tube delimiting a closed internal volume,
  a fluid disposed in the closed internal volume,
  a floating system disposed in the closed internal volume and bathed in the fluid, said floating system being arranged to rotate freely around a central axis of the annular tube and relative to said annular tube, and said floating system having a marking with at least one of four cardinal points, wherein the floating system is a ring connecting a plurality of spheres, and
  at least one permanently polarized magnetic element integral with the floating system allowing said floating system to undergo a moment of force causing the floating system to be aligned in a direction of an external magnetic vector by rotating around the central axis, wherein
  said annular tube is transparent on a portion of a wall of the annular tube so as to visualize the marking of the floating system from outside of the annular tube, and
  the at least one permanently polarized magnetic element is disposed on the ring away from each of the plurality of spheres.

2. The device according to claim 1, wherein the floating system is a torus.

3. The device according to claim 1, wherein said at least one permanently polarized magnetic element is a magnet overmoulded by material of the floating system.

4. The device according to claim 1, wherein the device includes a plurality of permanently polarized magnetic elements distributed in an axisymmetric manner over a circumference of the floating system.

5. The device according to claim 1, wherein said at least one permanently polarized magnetic element is formed of particles distributed within material of the floating system.

6. The device according to claim 1, wherein the device comprises a single permanently polarized magnetic element consisting of a magnetic layer covering the floating system.

7. The device according to claim 1, wherein a density of the fluid is substantially equal to a density of the floating system.

8. The device according to claim 1, wherein the fluid is composed of H—C—O hydrocarbon chains or of silicone oil.

9. The device according to claim 1, wherein the fluid has a viscosity between 0.3 mPa·s and 10 mPa·s.

10. The device according to claim 1, further comprising a capillary tube in fluid communication with the annular tube to add a function either of a barometer or of a thermometer to the device.

11. The device according to claim 10, further comprising a membrane disposed on the annular tube in order to transmit atmospheric pressure on the fluid for the barometer function.

12. The device according to claim 1, wherein the floating system and/or the annular tube comprise a clearance communicating with the fluid, said clearance trapping one or more air bubbles in order to give a level indication, and wherein when the floating system and the annular tube each include a clearance, the two respective clearances are opposite.

13. The device according to claim 1, wherein the floating system is provided with horizontal wheels, which are free to rotate about an axis parallel to the central axis and/or vertical wheels, which are free to rotate about an axis perpendicular to the central axis, said horizontal and vertical wheels being mounted with a clearance relative to the walls of the annular tube to reduce the friction in the directions parallel and perpendicular to the central axis.

14. A wearable object comprising an annular fluidic device, said wearable object comprising:
  an annular tube delimiting a closed internal volume,
  a fluid disposed in the closed internal volume,
  a floating system disposed in the closed internal volume and bathed in the fluid, said floating system being arranged to rotate freely around a central axis of the annular tube and relative to said annular tube, and said floating system having a marking with at least one of four cardinal points, wherein the floating system is a ring connecting a plurality of spheres, and at least one permanently polarized magnetic element integral with the floating system allowing said floating system to undergo a moment of force causing it to be aligned in a direction of an external magnetic vector by rotating around the central axis, wherein said annular tube is transparent on a portion of a wall of the annular tube so as to visualize the marking of the floating system from outside of the annular tube, and the at least one permanently polarized magnetic element is disposed on the ring away from each of the plurality of spheres.

15. The wearable object according to claim 14, wherein said wearable object is a watch case.

16. The wearable object according to claim 15, wherein the device is positioned on a bezel, a middle part, a dial, or a crystal of the watch case.

17. The wearable object according to claim 16, wherein the device is positioned on the bezel with the floating system visible through a portion of the transparent wall of the annular tube.

18. An annular fluidic device, comprising:

an annular tube delimiting a closed internal volume, a fluid disposed in the closed internal volume, a floating system disposed in the closed internal volume and bathed in the fluid, said floating system being arranged to rotate freely around a central axis of the annular tube and relative to said annular tube, and said floating system having a marking with at least one of four cardinal points, and at least one permanently polarized magnetic element integral with the floating system allowing said floating system to undergo a moment of force causing the floating system to be aligned in a direction of an external magnetic vector by rotating around the central axis, wherein said annular tube is transparent on a portion of a wall of the annular tube so as to visualize the marking of the floating system from outside of the annular tube, and the device further comprises a capillary tube in fluid communication with the annular tube to add a function either of a barometer or of a thermometer to the device.

* * * * *